United States Patent [19]
Schmitter

[11] 3,891,040
[45] June 24, 1975

[54] INCLINATION SPRING BALANCE

[75] Inventor: Albert Schmitter, Grueningen, Switzerland

[73] Assignee: Mettler Instrumente AG, Greifensee-Zurich, Switzerland

[22] Filed: Jan. 26, 1973

[21] Appl. No.: 326,820

[30] Foreign Application Priority Data
Feb. 25, 1972   Switzerland.......................... 2714/72

[52] U.S. Cl................................. 177/230; 177/173
[51] Int. Cl.² ........................................ G01G 1/18
[58] Field of Search............ 177/164, 166, 167–171, 177/190, 19 S, 225, 229, 234, 230, 260, 246, 203, 204

[56] References Cited
UNITED STATES PATENTS

| | | | |
|---|---|---|---|
| 1,289,885 | 12/1918 | Osborn ........................... | 177/230 X |
| 1,559,755 | 11/1925 | Jaenichen ........................ | 177/230 X |
| 1,782,654 | 11/1930 | Jaenichen ........................ | 117/203 |
| 1,953,664 | 2/1934 | Walker ........................... | 177/230 X |
| 2,631,838 | 3/1953 | Williams ......................... | 177/230 X |
| 3,055,444 | 9/1962 | Chyo.............................. | 177/225 X |
| 3,193,030 | 7/1965 | Meier............................. | 177/168 X |
| 3,382,942 | 5/1968 | Schmitter........................ | 177/170 |
| 3,647,010 | 3/1972 | Beardmore et al. ............ | 177/170 X |
| 3,698,496 | 10/1972 | Lohmann........................ | 177/168 X |

FOREIGN PATENTS OR APPLICATIONS
1,091,769   10/1960   Germany ........................... 177/246

Primary Examiner—Joseph W. Hartary
Assistant Examiner—Vit W. Miska
Attorney, Agent, or Firm—Hans Berman

[57]   ABSTRACT

The helical tension spring which counteracts the weight of an object on the scale pan of an inclination balance is fixedly attached to one arm of the balance beam to avoid friction in the connection between the spring and the beam. The attachment permits the spring position to be adjusted along the beam and the effective length of the spring to be adjusted. The weighing errors resulting from buckling of the spring are compensated by a suitably modified scale from which the weight is read.

9 Claims, 3 Drawing Figures

INCLINATION SPRING BALANCE

This invention relates to inclination balances, and particularly to an inclination balance in which the torque exerted on the balance beam by an object to be weighed is conteracted by a helical weighing spring.

Inclination spring balances have been known for a along time, going back at least to German Pat. No. 4980. While the weighing spring may operate in compression, it is generally simpler to employ a tension spring, and it has been common practice to form one of the terminal spring portions into a hook which is inserted in an eye slidable on the balance beam for adjustment and arrested in the adjusted position. It is difficult in such an arrangement precisely to define the effective spacing of the weighing spring from the main bearing of the beam, and the friction between the hook on the spring and the eye impairs the precision of the balance. It has been proposed, therefore, to grind a precise, sharp-edged configuration on the hook and to have it engage a V-shaped notch in the balance beam. The modified balance is capable of a precision of 1:1000 or better, but it is relatively costly to build and difficult to adjust.

It is a common feature of all known inclination spring balances that the weighing spring is pivotally connected to the balance beam, and that the friction in the connection can be reduced, but not eliminated, and unfavorably affects the precision of the balance.

It has now been found that it is entirely feasible fixedly to attach one terminal portion of a helical weighing spring to the beam, thereby to avoid all friction in the connection between the spring and the beam and to maintain a precisely defined effective spacing between the spring and the main bearing axis of the beam while avoiding the unfavorable effects of the resulting distortion or buckling of the spring during angular beam movement which are believed to have deterred balance designers heretofore from using a fixedly attached spring.

The weighing error introduced by the fact that one end of the spring is fixedly fastened to the balance beam, and that the spring axis is being bent when the beam angularly moves relative to the main bearing, may amount to 0.5 to 1% at greatest deflection of the beam from its normal conventional position in which the plane defined by the parallel axes of the main bearing and of the outer or hanger bearing is horizontal, and which is reached when the scale pan carries a weight equal to one half of rated capacity, the error thus being most serious when the weight of the object is near the full rated capacity of the balance or only a very small fraction thereof.

Mathematical analysis of the forces generated by the bending of the spring axis has led to the finding that the weighing errors introduced by the rigid fastening of a terminal spring portion to the balance beam can be reduced sufficiently to maintain a precision of approximately 1:1000 of the full weighing range of the balance if the afore-mentioned plane is inclined relative to the horizontal at a small acute angle, typically one to 5°, when the balance is loaded to one half of its capacity.

It is conventional in inclination balances employing a counterweight to space weight indicia on a scale arcuate about the main bearing axis and attached to the beam in such a manner that the difference $\Delta P$ between the weight indicated by the several indicia and that indicated by a center mark on the scale satisfies the relationship $\Delta p = k \tan \alpha$, wherein $\Delta P$ is expressed in units of weight, k is a constant proportionality factor, and $\alpha$ is the angle between the horizontal and the aforedefined plane of the bearing axes while each of the indicia is aligned with a stationary index on the fixed supporting structure of the balance. The angle $\alpha$ and $\Delta P$, of course, are zero in the conventional device when the stationary index is aligned with the center mark on the scale by a weight on the scale pan which equals one half of the rated balance capacity. This arrangement compensates for the error introduced by the shortening of the effective horizontal lever arm from the center of gravity of the counterweight to the main bearing axis.

In the absence of a counterweight, the modified spacing of weight marks on a scale would appear to be useless in a spring balance. However, further mathematical analysis of the effects of bending the axis of the weighing spring has shown that thirdorder non-linearities in the spring force also are compensated for by modifying the balance scale according to the tangens function defined above, and that such modification permits a balance of the invention to achieve a precision of 2:10,000.

It is known, for example from Meier U.S. Pat. No. 3,193,030, to provide an inclination balance having a counterweight with an adjustable taring spring, and such a taring spring may be used to advantage in a balance of the invention if provisions are made for avoiding the errors inherent in the use of conventional weighing springs and potentially present in taring springs. The taring spring, however, does not reduce the precision of the balance if it is secured between the stationary support structure of the balance and the pan carrier assembly, itself pivoted on the balance beam by an outer or hanger bearing and an element of a parallelogram suspension. When the taring spring and the weighing spring are connected to different arms of the balance beam and arranged to counteract each other, they may be arranged in a manner mutually to reduce their contributions to weighing errors.

Additional features of the invention and many of the attendant advantages will readily be appreciated from the following detailed description of a preferred embodiment when considered in connection with the appended drawing in which.

Figure 1:
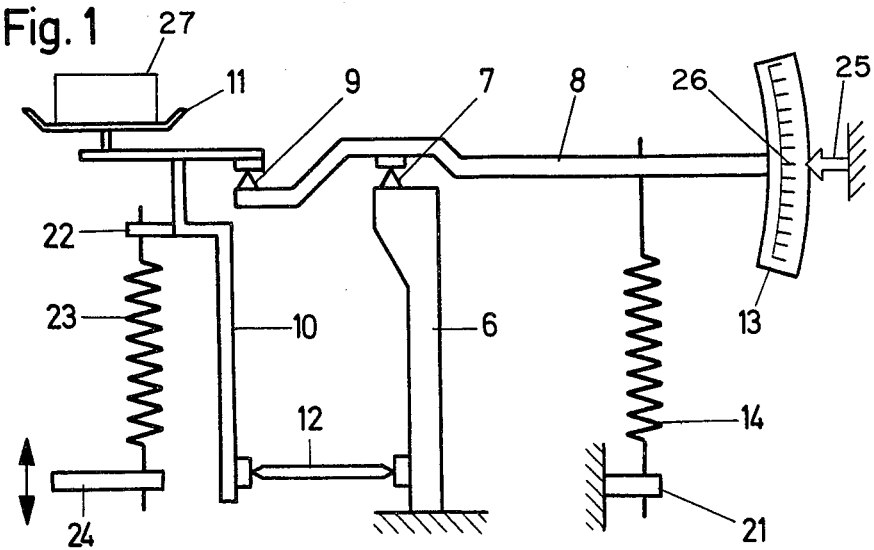
FIG. 1 is a fragmentary, front-elevational view of an inclination spring balance of the invention, not drawn to scale.

Referring now to the drawing in detail, and initially to FIG. 1, there is shown only as much of an otherwise conventional inclination spring balance as is needed for an understanding of the invention.

The normally stationary support structure of the balance is only partly shown and includes a column 6 carrying a knife bearing 7 which is the main bearing of the two-armed balance beam 8. An outer or hanger bearing 9 at one end of the beam 8 supports a rigid pan carrier assembly 10 on which a top loading scale pan 11 is mounted. The axes of the main bearing 7 and of the outer bearing 9 are parallel and horizontal when the balance is properly set up in operating condition. They jointly define a plane which is parallel to a rigid rod 12 pivotally interposed between a part of the column 6 downwardly spaced from the main bearing 7 and a part of the carrier assembly 10 equally spaced from the outer bearing 9. The effective length of the rod 12 is equal to the spacing of the bearing axes so that the column 6, one arm of the beam 8, the carrier assembly 10, and the rod 12 constitute a parallelogram suspension for the pan 11, as is conventional in itself.

The end of the other arm of the beam 8 carries a scale 13 circularly arcuate about the axis of the main bearing 7 and calibrated in units of weight from zero to full rated capacity of the scale, as is conventional and not specifically shown. The scale 13 may consist of transparent or translucent material and cooperate with a fixed light source from which a light beam passes transversely through the scale 13 to project an image of the arcuate row of weight marks on the scale 13 on a stationary ground glass carrying a fixed index. Such an optical weight indicating system is well known, and its purely mechanical equivalent has been shown in the drawing for the sake of simplicity. It merely consists of an index 25 fixed on the supporting structure of the balance and aligned with a central mark 26 on the scale 13 while a load 27, equal to one half the rated capacity of the balance, is supported on the pan 11.

Figure 2:
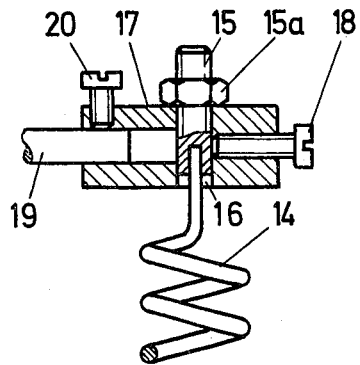
FIG. 2 shows the fastening arrangement which connects the weighing spring and the balance beam of the apparatus of FIG. 1, the view being in enlarged, front-elevational, fragmentary section on the line II—II in FIG. 3.
Figure 3:
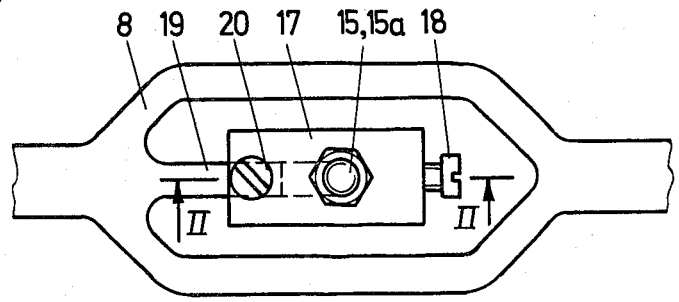
FIG. 3 shows the device of FIG. 2 and adjacent portions of the balance beam in top plan view.

The weight of the load 27 is balanced by the force of a helical weighing spring 14 one end of which is fixedly fastened to the beam 8 in a manner shown in more detail in FIGS. 2 and 3. The two axial ends of the tension spring 14 are straightened approximately axially, and the upper end is soldered into the bore of a hollow threaded stud 15 carrying a nut 15a. The stud is slidably received in a smooth bore 16 of a connector block 17. Its position axial relative to the spring 14 may thus be adjusted by means of the nut 15a which abuts against the top face of the block 17. A set screw 18 intersecting the bore 16 permits the stud 15 to be secured firmly in its adjusted position.

A portion of the beam 8 is branched, and an integral rodshaped projection 19 extends into the recess between the branches along the longitudinal axis of the beam 8. It is received with minimal clearance in a bore of the block 17, thereby permitting the block to be moved toward and away from the axis of the main bearing 7. A set screw 20 on the block 17 engages the projection 19 to secure the upper terminal portion of the spring 14 at a selected, precisely defined distance from the main bearing axis. Movement of the upper terminal portion relative to the beam 8 is prevented in the operating condition of the balance by the fixedly attached stud 15 and the elements which fasten the stud to the beam.

The fastening device more fully shown in FIGS. 2 and 3 thus permits the tension in the helical spring 14 to be modified by shifting the stud 15 in the bore 16, and securing the stud by means of the nut 15a and the set screw 18. As is shown in FIG. 1, the lower end of the spring is fixedly fastened to a bracket 21 of the stationary support structure so that the spacing of the two terminal spring portions can be changed at the fastening device while the beam 8 stands still, and this spacing, of course, changes as the beam 8 moves angularly about the axis of the main bearing 7.

The effective lever arm, on which the spring 14 acts, is adjusted but once at the balance manufacturer's plant. The spring tension may need infrequent adjustment during use, and the adjustment is performed simply and precisely by a person having minimal skill. An adjustment of the lower terminal portion of the spring 14 at the bracket 21 may be provided in a manner obvious from the showing of FIGS. 2 and 3, but has been found to be unnecessary. Minor changes in he horizontal distance of the lower spring end from the main bearing axis are without significant effect on the precision of weighing.

A taring spring 23, which is a helical tension spring, is suspended between a bracket 22 on the pan carrier assembly 10 and a bracket 24 on a travelling nut, not itself shown, which permits the bracket 24 to be shifted vertically toward and away from the bracekt 22 in a manner disclosed and illustrated in detail in the aforementioned patent to Meier. The weight of a container for goods to be weighed may be balanced by upwardly moving the bracket 24, and by thereby reducing the torque of the spring 23 transmitted to the beam 8 by an amount corresponding to the weight of the tare. The spring 23 may be soldered to the brackets 22, 24. The horizontal component in the movement of the bracket 22 during angular movement of the beam 8 is too small to cause significant buckling of the spring 23. The spring 23 biases the beam 8 to move about the main bearing axis against the action of the weighing spring.

An actual embodiment of the balance shown in the drawing has a capacity of 1000 grams. When the pan 11 is loaded with 500 g, the plane defined by the axes of the bearing 7, 9 slopes upward from the main bearing axis at an angle of 1.5° to the horizontal while the fixed index 25 is aligned with the central mark 26 on the scale 13, carrying the non-illustrated designation "500 g". The two groups of marks extending on the scale 13 in opposite directions from the central mark 26 are marked in steps of 7 g, that is 499 g, 498 g, 497 g etc. in an upward direction, and 507 g, 502 g etc. in a downward direction. The spacing of the marks deviates from an equiangular spacing too little to be capable of pictorial representation in the drawing, but each mark satisfies the relationship $$\Delta P = k \tan \alpha$$

wherein $\Delta P$ is the difference in the numerical weight value indicated by the mark from 500, and $\alpha$ is the angle between the position of the plane through the bearing axes when the mark is aligned with the index 25 and the position of the plane during alignment of the central mark 26 with the index 25. The constant $k$ is common to all weight marks.

The springs 14, 23 of the actual balance are identical, but the distance from the main bearing 7 to the terminal top portion of the weighing spring 14 is twice the corresponding distance from the taring spring 23, the corresponding relationship in the drawing being distorted for more convenient pictorial representation.

The actual balance is capable of a precision of $2:10^4$ based on its full capacity of 1000 g, and the beam 8 swings through an angle of 14° between 0 and 1000 g load.

The illustrated balance is merely representative of this invention, and may be modified in many ways without departing from the spirit and scope of the invention. Thus, compression springs may be substituted for one or both of the illustrated tension springs to adapt the balance to a specific purpose, to a specific casing, or to a specific suspension system for the pan 11, such as a hanger instead of the illustrated top loading system. The single springs 14, 23 may be replaced by sets of springs, and the taring spring 23 may be omitted or replaced by weights in a known manner.

The mark 26 has been referred to as being the "central mark", but it will be appreciated that it need not be centered on the scale 13 nor in the row of marks on the scale to perform its function. The term "central", as employed in this context, refers to a weight mark on the scale corresponding to the central area of the weighing range, or to approximately one half of the rated balance capacity.

It should be understood, therefore, that, within the scope of the appended claims, this invention may be practiced otherwise than as specifically disclosed.

What is claimed is:

1. An inclination balance comprising, in combination:
   a. a support, said support being stationary in the normal operating condition of said balance;
   b. a balance beam mounted on said support for angular movement about a main bearing axis horizontal in said condition,
      1. said beam having two arms extending from said axis in opposite directions;
   c. pan carrier means adapted to carry an object to be weighed;
   d. outer bearing means connecting said pan carrier means to one of said arms for pivotal movement about an outer bearing axis spacedly parallel to said main bearing axis, said axes jointly defining a plane;
   e. yieldably resilient means opposing angular movement of said beam about said main bearing axis under the weight of said object and including
      1. a helical weighing spring having an axis and two axially spaced terminal portions,
      2. first fastening means fastening one of said terminal portions to said support, and
      3. second fastening means fixedly fastening the other terminal portion to the other arm of said beam,
      4. said second fastening means including means preventing movement of said other terminal portion relative to said beam; and
   f. indicating means for indicating the angular position of said beam as a measure of said weight, said indicating means including a scale member and an index member,
      1. one of said members being fixedly mounted on said support, and the other member being fixedly fastened on said other arm,
      2. said scale member carrying a row of numerical weight marks spaced for sequential alignment with said index member during said angular movement of said beam,
      3. said row of marks including a central mark and two groups of marks extending from said central mark in opposite directions and including respective terminal marks farthest from said central mark and respectively constituting a zero mark and a full-load mark,
      4. said index member and said zero mark being aligned in said condition when said pan carrier means carries no object to be weighed,
      5. said index member and said full-load mark being aligned in said condition when said pan carrier means carries an object having the full rated weight of said balance,
      6. said index member and said central mark being aligned in said condition when said pan carrier means carries an object having one half of said full rated weight,
      7. said plane being obliquely inclined relative to the horizontal when said index member and said central mark are aligned.

2. A balance as set forth in claim 1, wherein said plane is inclined at an angle of 1° to 5° relative to the horizontal and slopes upward from said main bearing axis to said outer bearing axis when said index member and said central mark are aligned in said condition.

3. A balance as set forth in claim 1, wherein, said spring is a tension spring.

4. A balance as set forth in claim 1, wherein the numerical weight value of each one of said marks satisfies the condition $\Delta P = k \tan \alpha$, wherein $\Delta P$ is the difference in the numerical weight values of said one mark and of said central mark, $k$ is a constant common to all marks on said scale, and $\alpha$ is the angle between said plane, when in said position thereof, and said plane, when in the position assumed when said one mark is aligned with said index.

5. A balance as set forth in claim 3, further comprising an adjustable taring spring secured to said support and torque transmitting means connecting said taring spring to said one arm for exerting torque on said beam and for thereby biasing said beam to move angularly about said main bearing axis against the action of said weighing spring.

6. A balance as set forth in claim 5, wherein said taring spring is a helical tension spring having an axis and two axial end portions, one of said end portions being fixedly fastened to said pan carrier means.

7. A balance as set forth in claim 1, wherein said second fastening means include means for adjusting the effective spacing of said other terminal portion from said main bearing axis.

8. A balance as set forth in claim 7, wherein one of said fastening means includes means for adjusting the spacing of said two terminal portions from each other while said beam is in a fixed angular position.

9. A balance as set forth in claim 8, wherein said one fastening means is said second fastening means.

* * * * *